This invention pertains to electrical information storage circuits and is primarily useful in the digital data processing art. It is more particularly concerned with the long term storage of digital information by continuous regeneration of an electrical condition in a plurality of short term storage elements.

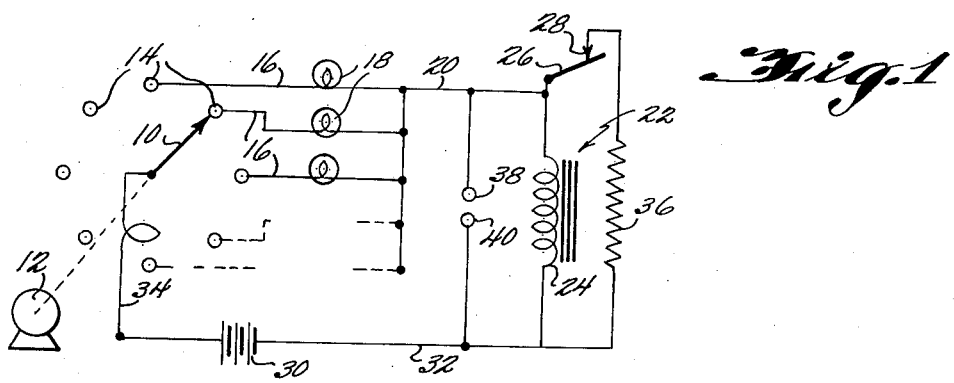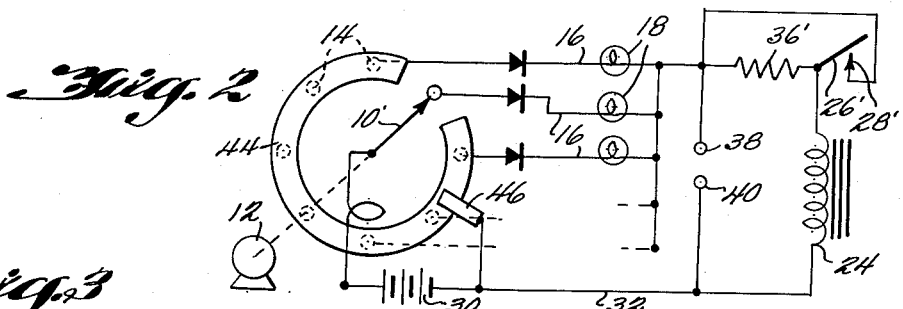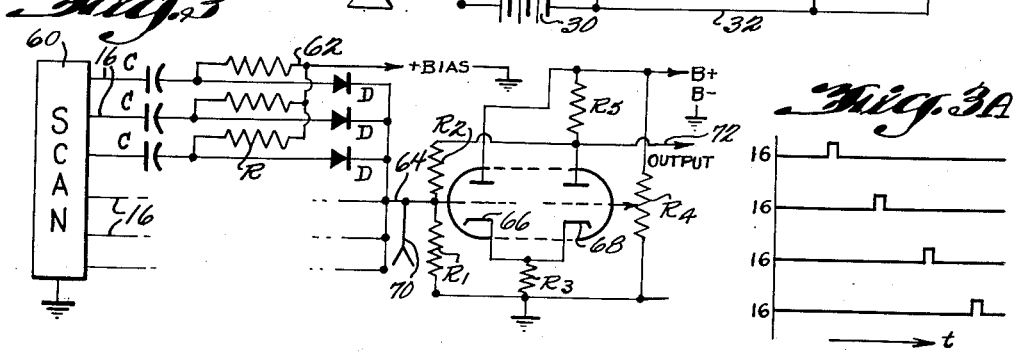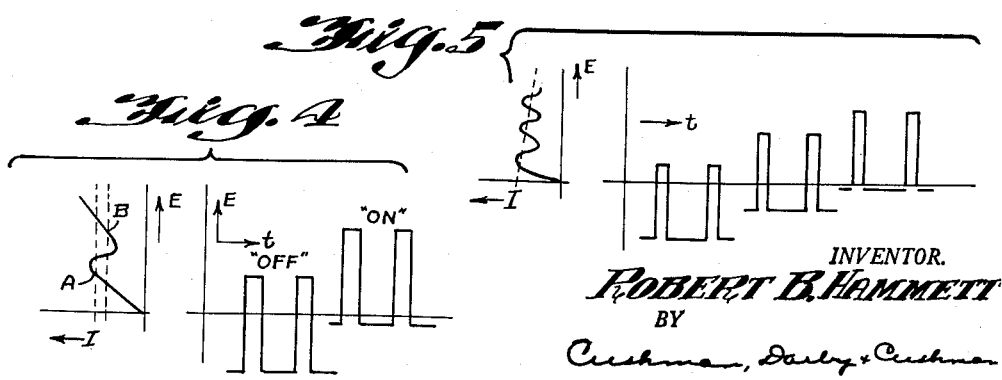
INVENTOR.
Robert B. Hammett
BY
Cushman, Darby & Cushman
ATTORNEYS 3,045,214
REGENERATED REGISTERS
Robert B. Hammett, 428 Whitney Bank Bldg., New Orleans 12, La.
Filed Jan. 14, 1960, Ser. No. 2,431
18 Claims. (Cl. 340—173)

The primary object of this invention is to provide conditions whereby a large variety of non-specialized components may act as storage elements.

Another object of the invention is to provide high speed reading of information from storage elements that are themselves not necessarily fast acting.

A still further object of the invention is to provide information storage apparatus that can be read without destruction of the stored information.

Still further objects of the invention are to provide for reading and regeneration of a storage element through a single circuit path; to provide for the simultaneous reading and regeneration of a storage element; to provide for the simultaneous reading and regeneration of a storage element through a single circuit path, and to provide a simple, flexible and economical storage system.

Other objects and the entire scope of the invention will become further apparent from the following detailed description of illustrative embodiments of the invention.

The hereinbelow described illustrative embodiments of the invention may be best understood with reference to the accompanying drawings, wherein:

FIGURE 1 shows a first illustrative embodiment of the invention;

FIGURE 2 shows another illustrative embodiment of the invention;

FIGURE 3 shows still another illustrative embodiment of the invention;

FIGURE 3A shows sequence of pulses appearing in the circuit of FIGURE 3;

FIGURE 4 shows plots of voltages related to currents, and voltages related to time, pertinent to the embodiment of FIGURE 3, and FIGURE 5 shows other plots of voltages related to currents, and voltages related to time, pertinent to modifications of the invention.

In FIGURE 1 there is provided a means for repeatedly generating scan signals in a plurality of input channels, this comprising a rotary commutation device having a contact arm 10 continuously driven, preferably at uniform rotational velocity, by a motor 12. The contact arm 10 contacts in succession a plurality of stationary contacts 14 (eight shown). A plurality of channels 16 are provided (three shown), each channel having a variable impedance means, in FIGURE 1 illustrated by incandescent lamps 18. The terminals of these lamps opposite from the channel connections to contacts 14 are collected upon a common line 20 which extends to a regenerative means designated generally by reference character 22. The latter is in the form of a relay having a winding 24 and a contact arm 26 which in the de-energized state of the relay is in contact with fixed contact 28. The circuit of FIGURE 1 is powered from a suitable source of electromotive force, such as battery 30. The relay winding 24 is connected by the common collection line 20 and line 32 connected to the battery 30. The opposite terminal of the battery 30 is connected to the rotating contact arm 10 over line 34. Between the line 32 and the fixed contact 28 is an impedance here shown in the form of resistance 36. The lamps 18 may be of the tungsten filament type and would, therefore, possess a positive temperature coefficient of resistance so that when hot (lighted) they offer more resistance than when cold (unlighted). Additionally, due to thermal inertia the lamps 18 will retain a portion of the resistance increase for a period of time after the current is discontinued. A lamp through which relatively little current passes will remain relatively cold and possess only a small resistance.

In operation of the FIGURE 1 circuit, positive voltage pulses will be sequentially applied to the respective channels 16, as the contact arm 10 sweeps the stationary contacts 14. Taking the uppermost illustrated channel 16, after the lamp 18 has been previously unlighted, the lamp 18 will offer relatively little resistance to current passage, and current will flow through line 20 and relay coil 24 in amount sufficient to operate the relay arm 26, removing resistance 36 from the circuit. Elimination of resistance 36 from the circuit increases the resistance of the circuit and limits the current passing through lamp 18. Therefore, the latter does not become appreciably heated, or lighted. It is to be understood that the length of time a lamp is switched into the circuit by commutator arm 10 is long compared to the operating speed of the relay 24. However, where a lamp 18 is previously lighted, the resistance in the circuit is high enough to limit the current so that the relay does not open. Resistance 36 stays in circuit, and enough current is drawn to maintain lamp 18 hot. The relay is adjusted to open as aforesaid when there is a large initial current due to the scanning of a cold (low resistance) lamp, but to remain closed due to small current when a hot lamp is scanned. Thus it becomes apparent that with the successive pulses appearing on the respective channels 16, a lamp 18 initially cold will remain so, but a lamp initially hot will remain hot. Thus it is that a variable impedance means, here a filament lamp, in each channel may be caused to maintain one of at least two conditions due to the regenerative means, here in the form of the relay 24 and resistor 36 acting in response to the effect upon the scanning signals applied to the channels 16 of the variable impedance devices 18.

The utility of the circuit of FIGURE 1 will be immediately appreciated. At the least, the condition of lamps 18 can be observed to provide a digital manifestation of information which is stored. Obviously, any electrical take-off can also be utilized to obtain the stored information. Many other forms of read-out, and therefore utility, will occur to those skilled in the art and prolonged enumeration thereof at this point is thought to be unnecessary.

Additionally, it is to be understood that the condition of the variable impedance device (lamps 18) in FIGURE 1 which it is desired to maintain, can be established in any convenient fashion. For example, using suitable synchronizing means (not shown) during the period when the contact arm 10 rests upon a particular contact 14, input terminals 38 and 40 may have applied thereto an additional e.m.f. which will light the connected lamp 18 which otherwise would not light. With this accomplished, the lamp 18 will remain lighted during subsequent sweeps of the commutator. Conversely, to extinguish a lighted lamp a reverse potential can be applied to input terminals 38 and 40 to prevent the continued lighted condition of a given lamp. Further to extinguish a lamp, a circuit could be applied directly across a particular lamp to change its state. The aforementioned application of e.m.f. can be in the sense of preventing or causing the operation of the relay 24.

It should be understood that in FIGURE 1 that certain filament lamps have been used only for purposes of illustration, and other examples will occur to the reader. To maintain but one, it would be possible to use ordinary small diameter copper wire, which has a temperature coefficient of resistance and thermal inertia. Basically, what is required is the combination of a scanning source and an impedance, the magnitude of which when scanned is dependent upon what happened to it when previously scanned, together with a device responsive to the change in magnitude of the impedance and acting thereupon to regenerate the impedance condition.

Lamps 18 may be carbon filament lamps having a negative coefficient of resistance, also thermisters, etc. In this case, a high initial current may cause a normally open relay to close, thereby further increasing the current by shunting the resistor 36′ which is otherwise in series with the relay. This type of circuitry is shown in FIGURE 2 where relay arm 26′ contacts stationary contact 28′ upon current flow of sufficient magnitude through winding 24′ caused by an "on" or lighted lamp. When a high resistance cold lamp is scanned the current is insufficient to close the relay.

In FIGURE 2 each channel is further provided with a uni-directional conducting device 42 located between the stationary contacts 14 and the lamps 18. Additionally, mounted for rotation with the contact arm 10 is a circular contact ring 44, continuous except for interruption in the vicinity of the end of contact arm 10 which contacts the stationary contacts 14. The arrangement is such, as will be apparent from FIGURE 2, that when the contact arm 10 is engaging one of the stationary contacts 14, the contact ring 44 is contacting all of the other contacts 14. Electrical engagement is made to the contact ring 44 by slip contact 46 which is electrically connected to the line 32 leading from the relay coil 24 to the battery 30. Due to the interconnection of all of the contacts 14 other than the one contacted by the arm 10, the diodes 42 are employed to prevent interaction between the respective channels 16. The electrical connections provided by the circular contact 44, slip contact 46 and the diodes 42, permits the parallel connection of a number of other registers (not shown) to a single commutating device.

It should be understood that the principle of the circular contact 44, the slip contact 46 and diodes 42 can be utilized in the circuitry of FIGURE 1.

Both FIGURES 1 and 2 contain the commutation of a number of time dependent electrical elements. By time dependent is meant an element whose electrical characteristics remain discernibly changed by the electrical condition existing at some prior time. In FIGURES 1 and 2 there are represented two basic types of time dependent electrical elements. In FIGURE 1 there is an increase in resistance with power applied to a lamp, while in FIGURE 2 there is a decrease in resistance with applied power. In FIGURE 1 the regeneration is by means of a relay and resistor combination arranged to decrease the current in the circuit when a certain voltage is reached and in this way acts as a discontinuous voltage controlled negative resistance (discontinuous because there is an abrupt jump to a lower current). In FIGURE 2 regeneration is achieved by a relay resistor combination arranged to increase the voltage drop across the combination when a certain current is reached, and therefore act as a discontinuous current controlled negative resistance.

Time constant control of the relays in FIGURES 1 and 2 is useful in increasing the efficiency. In this mode of operation the armature of a relay is arranged to remain in the position to which it is moved by the electromagnet for a time approximately equal to the time a single channel is selected by the scan. The relay in FIGURE 1 could then be arranged to switch not only the resistor but also itself out of the circuit, thereby completely opening the circuit. In FIGURE 2 the relay would shunt out of the circuit not only the resistor but also itself and a short circuit would then be present.

FIGURES 1 and 2 are, of course, useful embodiments of the invention, but specifically embody mechanical commutation means, which may be objectionable, or in any event are unnecessary. In FIGURE 3 the invention is illustrated in a somewhat more elegant form, constituted entirely of purely electronic circuitry. In this figure, block 60 is intended to represent an electronic scanning or commutation device for generating on the respective channels 16 sequential pulses. This source of scan is the electronic equivalent of the commutation device of FIGURE 2 and as pointed out in connection with FIGURE 2 a single scan source can provide scan to a number of registers. For example, the device of block 60 could be a tapped delay line, it could be a so-called ring counter, etc., arranged to generate upon the respective channels 16 time-spaced pulses as diagrammed in the time versus amplitude plots of FIGURE 3A.

In the FIGURE 3 embodiment there is provided in each channel 16 a capacitor C which is used as the variable impedance means, comparable to the lamps 18 of the embodiments of FIGURES 1 and 2, respectively. Each channel 16 further includes a diode D, and a bias resistor R. It will be noted the bias resistors R are connected in the channels 16 between the diodes and capacitors. And the opposite ends of the resistors R are collected upon a line 62 connected with a source of positive bias voltage. The opposite sides of diodes D (right-hand in FIG. 3) are collectively connected to a line 64 leading to a trigger circuit now to be described.

The trigger circuit comprises vacuum tubes 66 and 68 and associated circuitry as follows: The grid of tube 66 is connected to ground through $R_1$ and is connected to the anode of tube 68 through resistance $R_2$. The cathodes of tubes 66 and 68 are connected together, and connected to ground through $R_3$. The grid of tube 68 is connected to the movable contact of a potentiometer $R_4$, and the ends of potentiometer $R_4$ are connected respectively to ground and to a source of B+. The anode of tube 66 is connected directly to the source of B+ and the anode of tube 68 is connected to B+ through load resistor $R_5$. B− is connected to ground. The circuit further includes an input line 70 explained hereinbelow.

The circuit of tubes 66 and 68 is characterized, as is quite apparent, by a feedback path from the anode of tube 68 to the grid of tube 66 through resistor $R_2$. The signal level necessary to trigger this circuit is adjustable by $R_4$, and if the loop gain (the gain from the input on line 64 through both of tubes 66 and 68 and back to the input through $R_2$) is adjusted to provide a voltage-current characteristic as shown in FIGURE 4, then the trigger circuit will act as a negative resistance over a portion of its operating range in response to pulses of sufficient voltage input from the channel 16 via line 64. It will be observed that a low voltage pulse, below the trigger level adjusted by $R_4$, will cause more current to flow through line 64 than would a higher voltage pulse. The significance of the amount of current will be explained hereinbelow.

Another mode of operation of the circuit of tubes 66 and 68 is when the trigger circuit acts as a one-shot multivibrator with feedback to the input. To achieve this mode the loop gain is made large and a capacitor is added in series with $R_2$ whose value is selected to provide a pulse in response to a sufficiently high input pulse, the length of which in time is approximately equal to the length in time of the input pulse from a circuit channel 16. As in the mode first described, the circuit will cause more current to flow in a channel 16 and through line 64 when a below-trigger-level pulse is input, than in the case of an input pulse that causes triggering.

The operation of the circuit of FIGURE 3 may be analyzed as follows: Assume that both sides of a given capacitor C in a given channel 16 are caused to be at approximately the same potential. Such will be referred to hereinafter as the "on" condition. When a positive pulse from the scanning device of block 60 appears upon a given channel 16, this pulse will appear virtually undiminished via line 64 at the trigger circuit. The latter circuit is caused to trigger and, for the reasons given above, little current will flow through capacitor C in the given channel 16. Such limitation of current prevents the capacitor from charging, and it will therefore be perpetuated in the "on" condition during the application of scanning pulses upon the particular channel 16 from the sequence device of block 60.

Now consider the condition of FIGURE 3 where the right-hand plate of a capacitor C has been charged negatively with respect to the left-hand plate (as viewed in FIG. 3). Upon application of a positive pulse from the scanner device 60, due to the aforesaid charge upon the capacitor, this pulse will apply to the trigger circuit via line 64 considerably diminished. As a consequence the pulse will be unable to trigger the circuit of tubes 66, 68. Therefore, a relatively high current will flow through the selected channel 16, perpetuating the charge on the capacitor in this channel. It will thus be apparent that since each capacitor C is effectively isolated from every other one, there can be two possible stable conditions (triggering or not triggering). An output is available in the form of the serial reading of the "on" or "off" condition of all of the elements in the register. This serial output can be had, for example, by connection of an output line 72 to the anode of tube 68.

A number of methods can be used to change the condition in the circuit branches. Collectively, the conditions can be changed to "on" by increasing or to "off" by decreasing the bias from line 62 to all branches (by means not shown). In either case, as the bias is returned to its normal value, the branches will stay in whatever condition they were established by the bias change.

Another method of changing the storage in the circuit of FIGURE 3 is by applying an input signal via line 70 in the form of a positive pulse, synchronized in time with the application of pulses to the channel 16, to cause the circuit of tubes 66, 68 to trigger, or a negative input pulse to inhibit triggering.

Whether the storage of a circuit channel 16 can be changed in a single scan, or will require more than one scanning time, is dependent on two time constants and the input signal. In going from the "on" to the "off" condition, the trigger circuit is inhibited and the capacitor C in the channel 16 is charged through the input impedance of the trigger circuit and by the negative inhibit pulse input during the time of the scan pulse selecting the particular channel 16. In going from the "off" to the "on" condition, the trigger circuit is triggered by an external input on line 70, and the capacitor C in the selected circuit branch is discharged through the bias resistor when this channel is not being selected.

It will be appreciated that FIGURE 4 represents the voltage-current plot of many devices that can be employed to regenerate the registers of the present invention. The relationship of this plot to "off" and "on" pulse conditions is also represented in this figure. Point A is on the initial positive slope and is the point to which an "off" circuit branch drives the regenerating device, while an "on" circuit branch drives the regenerating device to point B. Thus, an "on" pulse causes less current to flow than an "off" pulse even though an "on" pulse raises the voltage to a greater value. This phenomena is due to the negative resistance region, which may be of a continuous or discontinuous type. It may be that for a given regenerative device there may be a number of successive positive and negative resistance regions, as diagrammed in FIGURE 5. This could be achieved as by paralleling the input circuit points of a plurality of trigger circuits such as that of FIGURE 3, but each with different adjustment as to trigger heights. In this manner, a number of stable conditions are available in each circuit channel, equal to one more than the number of negative resistance regions.

Starting with a device having a negative resistance characteristic similar to that of FIGURE 4 (this could be one of the many devices that intrinsically demonstrate this characteristic, or an amplifying device with a positive feedback network), good approximations of the optimum component values for FIGURES 3 can be determined as follows. The scan pulse height is selected to be sufficient to drive the negative resistance device to a point on the second positive resistance region (point B, FIGURE 4). The bias supply voltage and bias resistors R are selected to deliver charge to a capacitor C driving the complete scan cycle at least equal to the charge (current multiplied by pulse length time) lost near the bottom of the second positive resistance region (point B, FIGURE 4) when the scanned element is "on," but nevertheless not greater than the charge lost near the top of the first positive resistance region (point A, FIGURE 4) when this element is "off." The capacitor C is selected to prevent a voltage change driving a scan cycle, due to the bias change to an "off" element, sufficient to move it out of the first positive resistance region between scan pulses.

The large number of components contemplated for use as variable impedance elements in the circuit branches should be fully appreciated. Any component demonstrating an impedance variation for a period of time after the passage of current, which is detectable to a trigger circuit, can be used. Most trigger circuits of the present electronic art are readily adapted to this invention by the addition of a network providing positive feedback to the trigger input point.

To prevent interaction between circuit branches, the selection of only a single channel at any one time is necessary. However, it should be recognized that the interaction between channels can be useful in some cases. To utilize such mode of operation a resistor (not shown) can be placed in series with each circuit channel 16, the value of the resistance being selected so that a number of "on" channels must be selected simultaneously to produce triggering. The scan can now select various combinations of branches and the output will depend upon the number of "on" branches in the combinations. Regeneration in this mode can either be of all branches in a combination that triggers, of only those branches common to two or more triggering combinations, or of each branch individually by means of the usual sequential scan in addition to the combination scanning.

Another useful arrangement consists in the cascading of registers. In this type of arrangement a first set of registers is scanned and the output of this set is used to scan the branches of an additional set of registers. In this way, a number of sets of registers can be cascaded to achieve a complex storage network.

It is to be understood that the foregoing detailed description of illustrative embodiments of the invention is not intended in any way to limit the scope of the invention which is to be determined from the appended claims.

What is claimed is:

1. A regenerative circuit comprising means for repeatedly generating scan signals in at least one input channel, variable impedance means in the channel responsive to said signals in one of at least two manners dependent upon which of at least two conditions a scan signal finds said means to occupy, and regenerative means coupled to said channel and operative with said variable impedance means to provide an effective negative resistance region for maintaining the variable impedance means in any one of its said conditions in response to said scan signals.

2. A circuit as in claim 1 and including means for independently altering the state of said variable impedance means.

3. A circuit as in claim 1 wherein the variable impedance means is a device having differing impedance values at different temperatures.

4. A circuit as in claim 1 wherein the variable impedance means comprises a capacitance and charge-discharge circuits connected thereto.

5. A circuit as in claim 1 wherein the regenerative means comprises an impedance and a relay arranged to connect and disconnect the impedance from the circuit.

6. A circuit as in claim 1 wherein the regenerative means comprises a trigger circuit responsive differently to signal pulses of differing amplitudes delivered thereto from said variable impedance means.

7. A circuit as in claim 6 wherein the trigger circuit presents successive regions of positive and negative impedance.

8. A circuit as in claim 1 including a plurality of channels as recited, the scan signal generating means placing scan signals on the respective channels during discrete time periods, and means collectively coupling said channels to said regenerative means.

9. A circuit as in claim 7 including unidirectional-conducting devices in each of said channels.

10. A circuit as in claim 8 and including means for independently altering the state of one or more of said variable impedance means.

11. A circuit as in claim 8 wherein at least one of the variable impedance means is a device having differing impedance values at different temperatures.

12. A circuit as in claim 8 wherein at least one of the variable impedance means comprises a capacitance and charge-discharge circuits connected thereto.

13. A circuit as in claim 8 wherein the regenerative means comprises an impedance and a relay arranged to connect and disconnect the impedance from the circuit.

14. A circuit as in claim 7 wherein the regenerative means comprises a trigger circuit responsive differently to signal pulses of differing amplitudes delivered thereto from said variable impedance means.

15. A circuit as in claim 14 wherein the trigger circuit presents successive regions of positive and negative impedance.

16. A regenerative circuit comprising means for repeatedly generating scan signals in a plurality of input channels, each channel comprising a capacitance, a source of bias voltage, a connection between each channel and said bias source through a bias resistance for each channel, and a regenerative means coupled collectively to said channels, the last mentioned means comprising a circuit having at least two regions of positive impedance and a region of intervening negative resistance, the arrangement being such that a scan pulse finding said capacitance in a given state of charge of at least two distinct states of charge will cause presentation of a signal of given proportion to the regenerative means to cause the latter to draw current in amount required to maintain said capacitor in said given state of charge.

17. A circuit as in claim 1 wherein the regenerative means comprises a negative resistance device.

18. A circuit as in claim 1 wherein the regenerative means is responsive to a signal output of the variable impedance means when scanned to maintain the impedance means in a given state.

References Cited in the file of this patent
UNITED STATES PATENTS 2,208,655    Wright ------------------ July 23, 1940